March 27, 1962  K. E. H. DANIELSSON ETAL  3,026,717
APPARATUS FOR THE DETERMINATION OF THE
SEDIMENTATION RATE OF BLOOD
Filed March 4, 1959
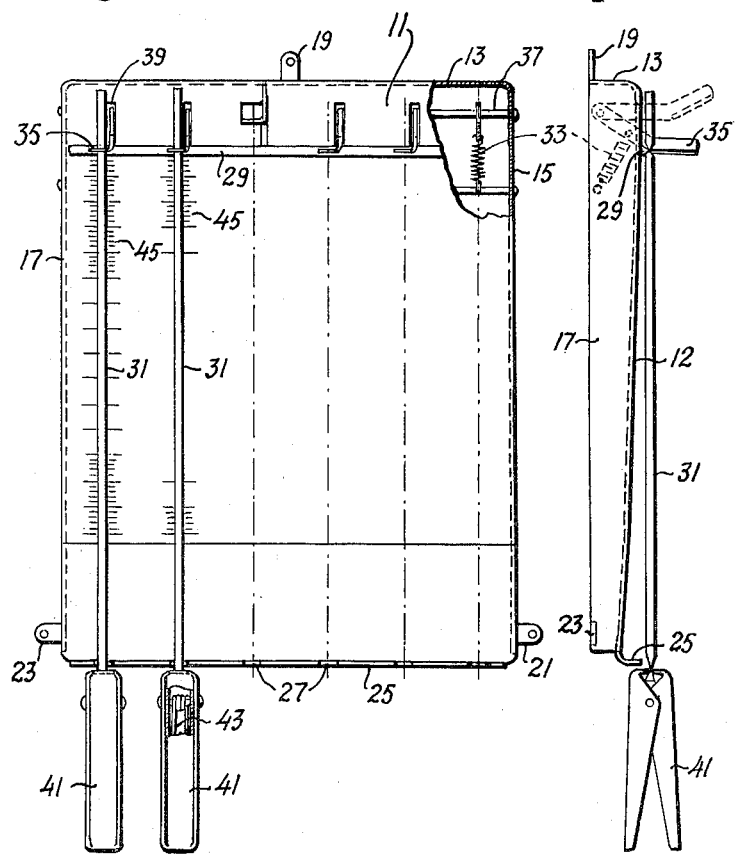
INVENTORS.
KARL ERIK HARRY DANIELSSON and JOHAN FOLKE SIGURD LUNDMARK
BY Cushman, Darby & Cushman
ATTORNEYS United States Patent Office 3,026,717
Patented Mar. 27, 1962

3,026,717
APPARATUS FOR THE DETERMINATION OF THE SEDIMENTATION RATE OF BLOOD
Karl Erik Harry Danielsson, Vaghustorget 3, Orebro, Sweden, and Johan Folke Sigurd Lundmark, Orebro, Sweden; said Lundmark assignor to said Danielsson
Filed Mar. 4, 1959, Ser. No. 797,064
Claims priority, application Sweden Mar. 5, 1958
6 Claims. (Cl. 73—61)

The present invention relates to an apparatus for the determination of the sedimentation rate of blood. According to a current method therefor, a tube is filled with a sample of the blood mixed with citrate and the tube is maintained in a vertical position during one hour, whereafter the length of the colourless plasma column formed at the upper end of the tube due to the sedimentation of the blood cells, is read off. In carrying out said known blood testing method a glass tube open at both ends is used, which tube is filled with a mixture of blood and citrate up to an engraved mark positioned 200 mm. above the lower end of the tube, and then placed in a special holder rack. At its lower part said holder rack is provided with a rubber block upon which the open lower end of the tube is placed, and at its upper part the holder is provided with a spring means pushing the tube lengthwise against said block in order to seal the tube end.

Said known apparatus suffers from several drawbacks. Due to their cost the glass tubes must be used repeatedly, which is unhygienic and involves infection risks. If the washing is not performed carefully, blood residues or remaining washing agents may stick to the inner side of tube and make the obtained sedimentation values unreliable. The glass tubes are breakable and their ends are easily damaged which may cause leakage. Further the holder racks often do not hold the tubes truly vertical. Finally the reading of the sedimentation value is uncertain and awkward, because it is performed by the aid of a ruler which usually cannot be held straight along the tube on account of protruding parts of the holder rack.

The present invention has for its object to provide an apparatus by means of which the sedimentation rate of blood can be determined without the above-mentioned drawbacks being encountered. Said device which comprises at least one tube for blood to be tested, which tube is closed at its ends and maintained in a vertical position by a holder, is essentially characterised in that the tube consists of a flexible tube of a plastic material, which tube close to its upper end is pinched and attached by a clasping means forming a fixed part of the holder, and in that said tube close to its lower end is pinched by a clip suspended in the tube and else free of the holder, which clip also forms a weight for straightening the tube and maintaining the same in a vertical position, and in that the holder below the fixed clasping means has a plane face upon which a graduated scale is arranged.

When using such a device the infection risk and the washing work are eliminated, because the plastic tube, which represents merely a trifling cost, is changed for each blood test. Further the flexible tube is automatically held in a truly vertical position and along the graduated scale of the holder, whereby the sedimentation values will be reliable and easy to read off. The pinching of the tube at its both ends involves a good sealing thereof, so that leaking of blood cannot take place.

A preferred embodiment of the apparatus according to the invention will be more fully described hereinbelow with reference to the accompanying drawing. FIG. 1 is an elevational front view of the apparatus, certain parts being broken away, and FIG. 2 is an elevational side view thereof.

In the drawing, 11 designates a holder, adapted for the simultaneous attachment of six tubes containing blood samples which should be tested as to the sedimentation rate.

The holder comprises a shallow sheet metal cover having an essentially flat front wall 12 and adjoining squarely bent marginal parts forming an upper wall 13 and two opposite side walls 15 and 17. The cover is adapted for attachment to a vertical wall of a room, a cabinet or similar, and therefore the back edges of the last-mentioned three walls of the cover are located in one and the same plane and are provided with bent-out attachment tabs 19, 21 and 23. The upper wall 13 is rectangular, whereas the side walls 15, 17 have a downwardly decreasing width. Consequently, when the cover is attached in the proper position on the wall of a medical laboratory or siimlar, the front wall 12 will be slightly inclined relatively to the vertical plane. As shown in the drawing, the lowermost part of the front wall may be inclined backwards at a somewhat greater angle than its main part. At the lower extreme the front wall is bent forward to form a protruding ledge 25 having cut-out slits 27.

At its upper part the sheet metal cover has an embossed ridge 29 extending straightly and horizontally across the front wall. The ridge 29 and the ledge 25 are parallel and are located at an accurately determined mutual distance, usually of 200 mm.

The tubes for blood tests pertaining to the apparatus, which are designated by 31 in the drawing, consists of pieces having lengths of about 220 to 250 mm., cut off from a roll of a transparent, flexible tube consisting of a preferably rather soft, plastic material, such as polyvinyl chloride or polyethylene, and having an inner diameter of about 2.5 mm. and a wall thickness of about 0.5 mm.

The upper end of the tube 31 is secured to the holder 11 by means of a clasp comprising a lever 35 operated by a coiled spring 33, and an edge of which is pressed towards the ridge 29, so that the tube is pinched together and is tightly closed a short distance from its end. The lever 35 pivots about a rod 37 extending between the sides 15, 17 of the cover and protrudes through a slit 39 in the front wall of the cover.

Suspended in the lower end of the tube is a loose spring clip 41 consisting of two pivotally connected halves, a spring 43 pressing the jaws of the clip towards each other, thereby pinching the tube 31 at a short distance from its lower end and tightly closing the same. The clip 41 which weighs about 40 to 75 grams, also serves as a weight for straightening out the tube 31 and maintaining the same steadily in its proper position. The front side of the cover being inclined backwards, as above described, the tube will nowhere rest thereagainst but the entire length of the tube between the end pinches will be held truly vertical by means of the freely suspended clip 41. This is true even if the holder be mounted on a wall or similar in a somewhat leaning position.

Arranged on the plane front side of the holder are graduated scales 45, the graduations of which start at the ridge 29 and which extend along the positions normally taken up by the tubes. The scales are located immediately behind the tubes which enables a convenient and accurate reading of the sedimentation values.

The apparatus functions as follows: When the tube has been filled with blood by sucking at its upper end, the lower tube end is pinched by the clip 41. Then the attachment of the tube to the holder is performed in such a manner that while the clip 41 is held against the under side of the ledge 25 and the tube is guided sidewise by one of the slits 27 therein, the upper end of the tube is pulled cautiously so that the tube is straightened out. Then the lever 35, previously being swung aside upwards, is let loose so that it pinches the upper end of the tube by pressing it against the ridge 29. Now the clip 41 can be left hold of and it swings out from the ledge 25 and is thereafter free of the same and suspended merely by the tube itself. In this way the length of the tube as measured between the pinches automatically gets equal to the predetermined value.

The embodiment above described merely is an example which can be modified as to its details without departing from the scope of the invention as set forth in the following claims.

We claim:

1. An apparatus for the determination of the sedimentation rate of blood, comprising at least one flexible tube made of transparent plastic material for the blood to be tested, a holder for said tube, said tube being closable at its ends and being maintained in a vertical position by said holder, clasping means constituting a fixed part of said holder, said clasping means pinching said tube adjacent the upper end thereof and attaching the same to said holder, a clip suspended on the tube and free of said holder, said clip pinching said tube adjacent its lower end and also constituting a weight for straightening said tube and maintaining the same in said vertical position, said holder having below said fixed clasping means, a plane face including a graduated scale for measuring said sedimentation rate.

2. Apparatus as claimed in claim 1 wherein the face of the holder having the graduated scale, is inclined at a small angle backwards from the vertically suspended tube.

3. Apparatus as claimed in claim 1 including abutment means on said holder, rearwardly of said clip, for holding said clip when the tube is pulled upwards and inserted into the upper fixed clasping means thereby providing a predetermined distance between the pinch points of the tube.

4. An apparatus for the determination of the sedimentation rate of human blood, comprising a thin flexible tube of transparent plastic material, a support having a flat essentially vertical front face with a graduated scale thereon for determining said sedimentation rate, a fastening means located at the upper part of said face and adapted for attaching the upper end of said tube to said support, and a weighted spring clip suspended on the tube for closing the lower end of the same and keeping the tube vertically stretched out below said fastening means and along said front face.

5. An apparatus for the determination of the sedimentation rate of blood comprising a board having an essentially vertical front face, a graduated essentially vertical line being applied to said face, a flexible tube made of transparent material for containing a blood sample, a spring actuated member located at the upper end of said graduated line for attaching said tube to said board, and a clamping weight attached to said tube below said member for straightening out said tube along said graduated line and for closing the lower end of said tube.

6. An apparatus as claimed in claim 5, in which the weight forms a spring clip for closing the lower end of the tube.

References Cited in the file of this patent

UNITED STATES PATENTS

| 2,700,973 | Ju | Feb. 1, 1955 |
| 2,712,751 | Bracco et al. | July 12, 1955 |
| 2,741,913 | Dovas | Apr. 17, 1956 |

FOREIGN PATENTS

| 726,095 | Great Britain | Mar. 16, 1955 |
| 1,166,754 | France | June 23, 1958 |